US008195198B1

(12) United States Patent
Shaw et al.

(10) Patent No.: US 8,195,198 B1
(45) Date of Patent: Jun. 5, 2012

(54) SYSTEM, METHOD AND APPARATUS FOR PROTECTING PRIVACY WHEN A MOBILE DEVICE IS LOCATED IN A DEFINED PRIVACY ZONE

(75) Inventors: Venson Shaw, Kirkland, WA (US); Q. James Hu, Sammamish, WA (US); Justin McNamara, Atlanta, GA (US); DeWayne Allan Sennett, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 446 days.

(21) Appl. No.: 11/734,430

(22) Filed: Apr. 12, 2007

Related U.S. Application Data (60) Provisional application No. 60/896,086, filed on Mar. 21, 2007.

(51) Int. Cl.
*H04W 24/00* (2009.01)
(52) U.S. Cl. .................... 455/456.4; 455/456.1
(58) Field of Classification Search ..... 455/456.1–456.6
See application file for complete search history.

(56) References Cited

U.S. PATENT DOCUMENTS

| | | | |
|---|---|---|---|
| 6,011,973 A * | 1/2000 | Valentine et al. | 455/456.6 |
| 6,694,143 B1 * | 2/2004 | Beamish et al. | 455/456.1 |
| 6,782,266 B2 * | 8/2004 | Baer et al. | 455/456.4 |
| 7,873,351 B2 * | 1/2011 | Yahagi | 455/411 |
| 2004/0043774 A1 * | 3/2004 | Lee | 455/456.1 |
| 2005/0181808 A1 * | 8/2005 | Vaudreuil | 455/456.3 |
| 2005/0282559 A1 * | 12/2005 | Erskine et al. | 455/456.4 |
| 2006/0099971 A1 * | 5/2006 | Staton et al. | 455/456.6 |
| 2006/0105758 A1 * | 5/2006 | Maislos | 455/420 |
| 2009/0197584 A1 * | 8/2009 | Snow et al. | 455/418 |

* cited by examiner

*Primary Examiner* — Steven Lim
(74) *Attorney, Agent, or Firm* — Woodcock Washburn LLP (57) ABSTRACT

A system, method and apparatus for protecting privacy when a mobile device is located in a defined privacy zone are described herein. The available features that a user of a mobile device may use are controlled while the mobile device is located in a define privacy zone. Once a mobile device is detected in the define privacy zone, a database is accessed to determine if the mobile device has the features available that are to be disabled. If the features are available, a disable signal is sent via the communications network to the mobile device and the feature is disabled. Once the mobile device is detected to be outside of the defined privacy zone, the previously disabled mobile device feature is enabled.

27 Claims, 6 Drawing Sheets

SYSTEM, METHOD AND APPARATUS FOR PROTECTING PRIVACY WHEN A MOBILE DEVICE IS LOCATED IN A DEFINED PRIVACY ZONE

CROSS-REFERENCE TO RELATED APPLICATION

This application claims the benefit of U.S. Provisional Patent Application No. 60/896,086, filed Mar. 21, 2007. The contents of U.S. Provisional Application No. 60/896,086 are incorporated herein by reference in its entirety.

FIELD OF THE INVENTION

This invention relates to wireless communication and, more particularly, to techniques for protecting the privacy of a designated location.

BACKGROUND OF THE INVENTION

Mobile devices today typically have expanded communication functions and capabilities. In the case of cell phones, for example, a user is capable of having access to voice calling, incoming call alert, incoming message alert, text messaging, instant messaging, picture messaging, and video messaging. These and future applications and capabilities are becoming widely available due to the rapid advancement of digital, wireless technology and the hardware and software integration on the mobile devices, and particularly, mobile phones. Mobile phones have further become highly affordable as a result of the volume of production and rapid cost reduction, and thus, their use has become essentially ubiquitous.

Users typically move freely from location to location with mobile phones and use mobile phone functionality just as freely. Additionally, this use may occur without drawing the attention of others. Further, because of the expansion of wireless telecommunication network coverage, users can increasingly communicate or transfer information from any source location to any other destination location, including through the internet or to another user's mobile phone.

This ability to transmit data from almost anywhere to almost anywhere has become increasingly problematic with respect to security or privacy. As an example, a user having a mobile phone with camera capabilities may enter an unauthorized area in a company having confidential information or a sensitive location such as a nightclub, court room or military facility and take photos and/or video clips of documents, events, or people at the location. As has become evident in numerous examples that find their way onto popular video and photograph sharing websites, this activity can often be performed and achieved without alerting anyone around the user.

Today, usually the only counter-measure a company or individual takes to attempt to control this surreptitious activity is to post a physical sign with a warning message to remind people that certain activities are forbidden. The only other alternatives may be to request the user to turn their mobile phone off or not to allow mobile phones entering into the area at all. Both of these alternatives are rarely well received and ineffective, especially considering the small miniature size of cell phones.

SUMMARY OF THE INVENTION

In accordance with an aspect of the present invention, a system for use in a wireless network is disclosed. The system includes a server coupled to a wireless services provider network having a wireless base station which provides wireless coverage to a geographic area, a mobile device locator subsystem coupled to the system, and a database used for storing updating, and retrieving current up-to-date wireless mobile devices available on the market and their associated features and capabilities. In use, a user defines a privacy zone in the geographic area by inputting the geographic boundaries of the privacy zone and the features of a mobile device can be disabled while the mobile device is in the privacy zone. The mobile device locator subsystem will alert the system that a mobile device has been located in the privacy area. The server computer retrieves from the database the mobile device and the available features on the mobile device. The system will then disable the features on the located phone preferably through over the air provisioning (OTA).

In accordance with an additional aspect of the present invention, a method for increasing the privacy of a specified location in a wireless network is disclosed. The method comprises defining the boundaries of a privacy zone within the geographic area and selecting from a plurality of mobile device features, a selective plurality of features are to be disabled if a mobile device is located within the defined privacy zone.

In accordance with an additional aspect of the present invention, the method further comprises detecting a mobile device located in the defined privacy zone, determining if the mobile device has the selected plurality of features to be disabled, and if the features are available, disabling the selected plurality of features while the phone is located within the boundaries of the defined privacy zone.

In accordance with a still further aspect of the present invention, the method further comprises detecting when the mobile device is no longer located within the boundary of the defined privacy zone and re-enabling the selected plurality of features that were disabled.

The foregoing summarizes only a few aspects of the present invention and is not intended to be reflective of the full scope of the present invention as claimed. Additional features and advantages of the invention are set forth in the following description, may be apparent from the description, or may be learned by practicing the invention. Moreover, both the foregoing summary and following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate multiple embodiments of the invention and, together with the description, serve to explain the principles of the invention and are not intended in any manner to limit the scope of the invention.

In the drawings, the same reference numbers identify identical or substantially similar elements or acts. To easily identify the discussion of any particular element or act, the most significant digit or digits in a reference number refer to the Figure number in which that element is first introduced (e.g. element 102 is first introduced and discussed with respect to FIG. 1).

Any headings provided herein are for convenience only and do not necessarily affect the scope or meaning of the claimed invention.

DETAILED DESCRIPTION

In the following description, numerous specific details are provided, such as specific data flows, specific methods of disabling various mobile device features to protect the privacy of a defined area, etc. to provide a thorough understanding of, and enabling description for, embodiments of the invention. One skilled in the relevant art, however, will recognize that the invention can be practiced without one or more of the specific details, or with other symbols, methods, etc. In other instances, well-known structures or operations are not shown, or are not described in detail, to avoid obscuring aspects of the invention.

In general, alternatives and alternative embodiments described herein are substantially similar to previously described embodiments, and common elements and acts or steps are identified by the same reference numbers. Only significant differences in construction or operation are described in detail.

Unless described otherwise below, the construction and operation of the various blocks shown in the referenced figures are of conventional design. As a result, such blocks need not be described in further detail herein, because they will be understood by those skilled in the relevant art. Such further detail is omitted for brevity and so as not to obscure the detailed description of the invention. Any modifications necessary to the blocks of any embodiments can be readily made by one skilled in the relevant art based on the detailed description provided herein.

Further, the following description should not be viewed as limited to either a local wireless communications system, such as a home-based wireless network, or a remote wireless communication system, such as a cellular telecommunications network. One skilled in the relevant art will recognize that the invention can be practiced in substantially similar manners in wireless communication networks of varying granularity. As described below, a wireless transmitter may be any type of device that facilitates wireless communication between one or more servers that control a wireless network and a wireless mobile device in communication with the wireless transmitter.

In a non-limiting example, in a local network, such as one in a residential home, the server may be a desktop computer, the wireless transmitter may be an access point, and the mobile device may be a laptop computer in wireless communication with the access point. In another non-limiting example, and the one used primarily in the description below, the server may be one or more network servers controlling a cellular wireless network, the wireless transmitter may be a cell site or a base station, and the mobile device may be a cell phone. Additionally, one skilled in the relevant art should appreciate that the system, apparatus, and method described herein may be wholly local or wholly remote. Rather, the elements described may be partially local and partially remote and that the communication pathways described herein are merely for convenience and do not represent any intent to limit the scope of the present invention to that particular setup.

A privacy system, and in particular, a system and corresponding method for disabling mobile device communication features when the mobile device is located in a defined privacy zone, is described herein. The privacy system, as is generally referred to herein, allows users to remotely configure available mobile features, such as a camera or instant messaging capabilities on a cell phone, to increase the privacy of an area defined by the user to be a privacy zone. The user can determine the geographic area to implement the present invention and the specific mobile device features to be disabled while the mobile device is located in the privacy zone. To determine if a wireless device is located in the privacy zone, a wireless device locating subsystem is used by the system to detect when mobile devices are located in the privacy zone. The present invention also describes how, when the mobile device leaves the privacy zone, the mobile device features that were disabled, if any, are reactivated for normal mobile device usage.

Figure 1:
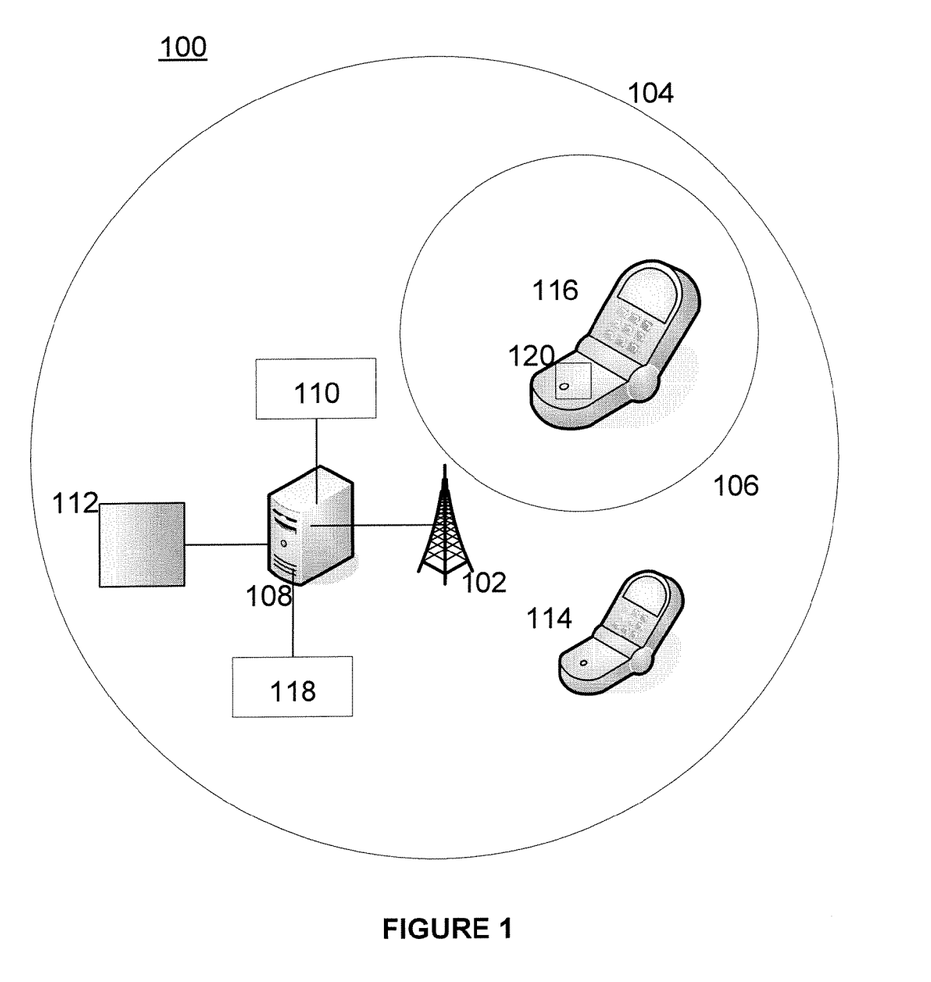
FIG. 1 is a block diagram of a privacy system in a preferred embodiment used to disabled mobile device features while the mobile device is located in a defined geographic zone.

FIG. 1 is a block diagram of a privacy system 100 capable of creating and operating a privacy zone in a wireless telecommunication network under one embodiment of the invention. The following description uses the term "cell phone" to mean a mobile device used in a cellular telecommunications network. The term "cell phone" for purposes of the following description is synonymous with the term "mobile device" as used above and is used to provide one non-limiting example of the features of the invention. Privacy system 100 preferably has wireless base station 102 that provides wireless telecommunication coverage to cell 104. Base station 102 is preferably controlled and serviced by server 108. One skilled in the relevant art should appreciate that the coverage area of cell 104 may vary according to base station 102 signal strength, geography of the land in cell 104, interference with other mobiles stations, etc. To simplify the detailed description, cell 104 is shown to be circular, though it should be understood by those of relevant skill in the art that cell 104 may vary in size and shape depending upon a multitude of factors.

To implement a preferred embodiment of the present invention, a user inputs geographic data to input system 118, which may be a separate computer than server 108 or a subsystem of server 108, to define the geographic boundaries of privacy zone 106. Further, the user preferably inputs into input system 118 available cell phone features that the user desires to be disabled while the cell phone is located in privacy zone 106. The geographic boundaries of privacy zone 106 may vary and any variance is considered to be within the scope of the present invention. For example, privacy zone 106 may be a building, a particular area within a building, a ballpark, etc. Thusly, one skilled in the relevant art should appreciate that the present invention is not limited to any particular geographic and/or geometrical definition. Once the user inputs geographic data for privacy zone 106 into server 108, thus initializing the system, server 108 preferably will cause database 112 to be populated with a list of current cell phones available in the marketplace and their associated features.

In operation, locator subsystem 110 preferably monitors the location of cell phones in cell 104. Locator subsystem 110 may be integrated with a network or act as a stand-alone system in communication with server 108. In a non-limiting example, current cellular systems provide for the capability of determining the location of a cell phone based upon triangulation of the received transmitted cell phone signal time delay as measured from three base stations in the network. In that example, locator subsystem 110 would most likely be an integrated process of server 108. In another non-limiting example, locator subsystem 110 may be a near field communication post in communication with server 108. In that example, locator subsystem 110 may be a separate apparatus in communication with server 108. Therefore, one skilled in the relevant art should appreciate that the embodiment of locator subsystem 110 is not limited to any particular embodiment, and should understand that any embodiment whereby cell phone location detection is communicated to server 108 is considered to be within the scope of the present invention.

If a cell phone is located outside of privacy zone 106, such as cell phone 114, system 100 preferably does not interact with cell phone 114 in any manner other than common communications in a cellular telecommunications system. If locator subsystem 110 detects a cell phone in privacy zone 106, such as cell phone 116, locator subsystem 110 preferably notifies server 108 that locator subsystem 110 has detected cell phone 116 in privacy zone 106. Server 108 then preferably accesses database 112 to determine if information regarding the available features on cell phone 116 is in database 112. If information on cell phone 116 is present in database 112, server 108 then preferably accesses database 112 to determine if cell phone 116 has the selected features required to be disabled. If cell phone 116 has any of the features to be disabled, server 108 then preferably generates and causes wireless transmitter 102 to transmit a disable signal to disable the selected features that are available on cell phone 116, preferably through over the air provisioning (OTA).

Upon receipt of the disable signal by cell phone 116, processor 120 of cell phone 116 in cell phone 116 preferably causes the specified features to be disabled. Once cell phone 116 is detected to be outside of privacy zone 106, locator subsystem 110 preferably notifies server 108. Server 108 then in turn preferably generates and causes wireless transmitter 102 to transmit an enable signal to enable those features that were previously disabled. Upon receipt of the enable signal by cell phone 116, processor 120 preferably causes the specified features to be enabled.

Figure 2:
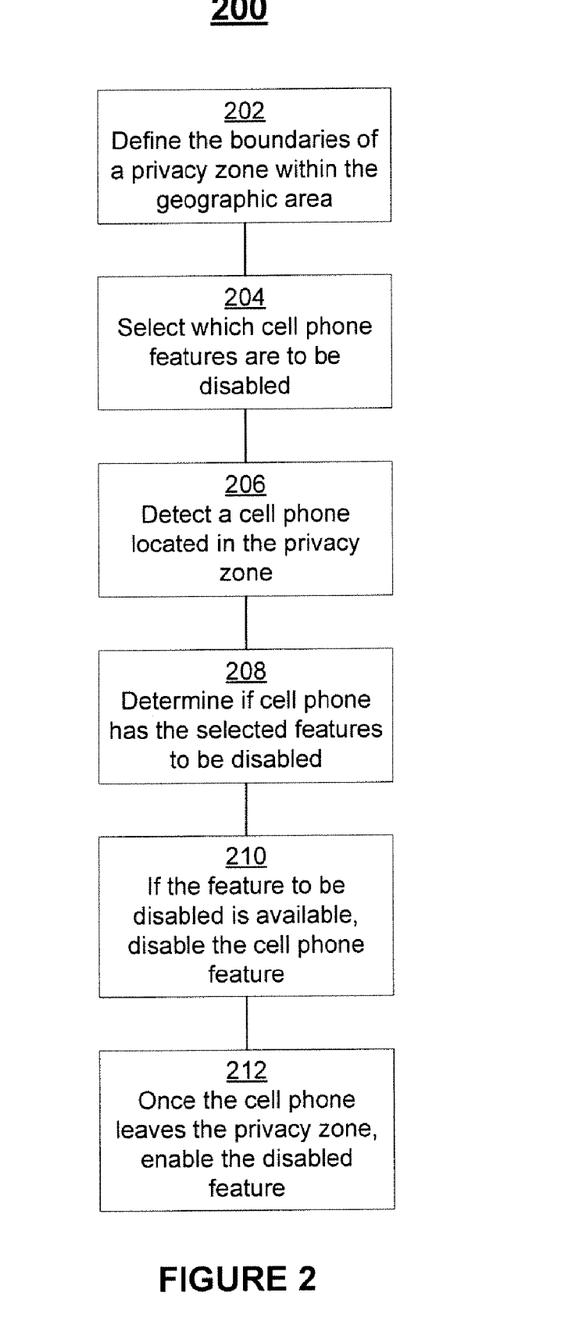
FIG. 2 is a flow diagram of a method for creating and operating a privacy zone in accordance with the system of FIG. 1.

FIG. 2 is a flow diagram of method 200 illustrating a preferable method implemented by the system of FIG. 1. It should be noted that the performance of the steps described herein are not limited to performance by a user. Rather, one of relevant skill in the art should appreciate that steps described herein that are describe to be performed by a user may be performed by a computer or may be performed in part by a user and by a computer, or may be performed entirely by a user. Further, the present invention is not limited by the order in which the following steps may be implemented. Additionally, FIGS. 2-5 are a preferred method of the invention as used in a cellular telecommunications network, but as previously discussed, the cell phone is one type of mobile device and, thusly, the scope of the present invention should not be limited to a cell phone.

Referring further to FIG. 2, at step 202, if a user desires to set up a privacy zone in a particular wireless coverage area, the user will preferably define the geographic boundaries of the privacy zone in the wireless coverage area. These geographic boundaries may vary in scope and application. Some non-limiting examples include a building, a room within a building, a ballpark, a sporting venue, a museum, and a nightclub. Once the user defines a privacy zone, at step 204 the user then preferably selects which cell phone features are to be disabled while a cell phone is located in the defined privacy zone.

At step 206, if a cell phone is thereafter detected to be located within the privacy zone defined in step 202, step 208 is preferably performed in which a determination is made whether or not the cell phone detected in the privacy zone is capable and/or available for use the features selected in step 204. If the features are available for use on the cell phone, step 210 is preferably performed wherein the cell phone features are disabled. It should be noted that use of the term "remote" is used only to signify that the disabling of the selected features of a mobile device is not generated at the mobile device, but rather, is generated by a remote controller. In a non-limiting example, the disabling message may be transmitted by a base station over a control channel assigned to the cell phone. In another non-limiting example, the disabling message may be transmitted by a local transmitter acting in concert with the wireless network.

Once the cell phone is detected to no longer be located in the privacy zone, at step 212 the cell phone feature is preferably re-enabled and the process is finished.

Figure 3:
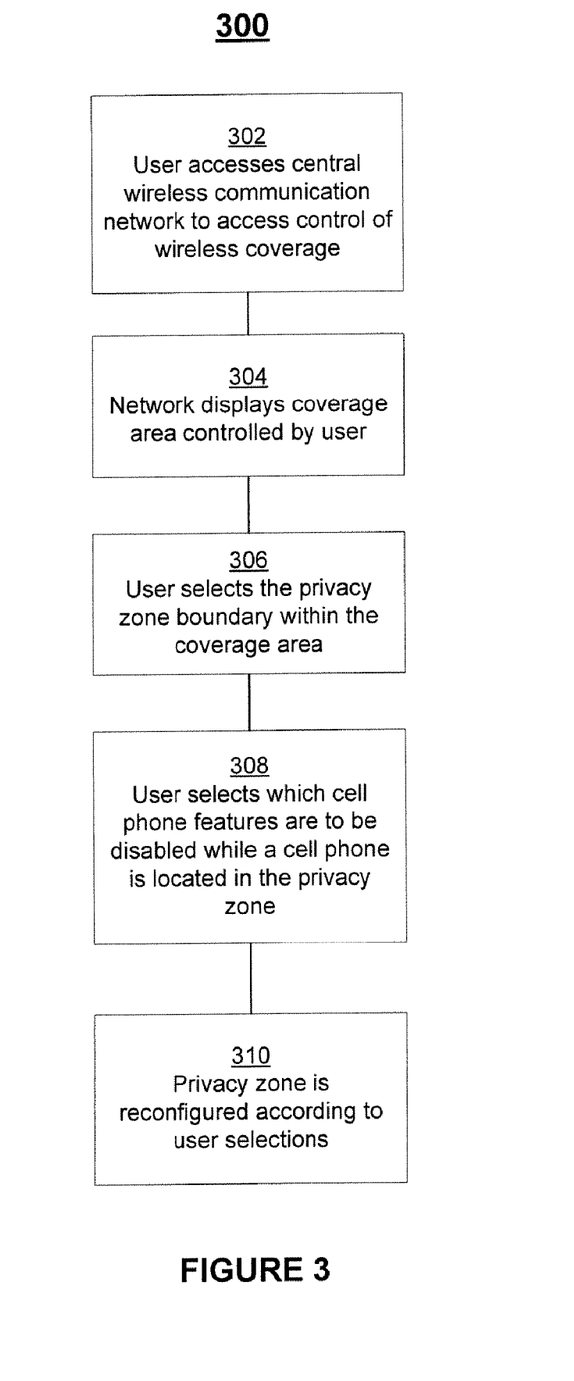
FIG. 3 is a flow diagram of a method for creating a privacy zone in a wireless network in accordance with the system of FIG. 1.

Method 300, as shown in FIG. 3, provides more explanation about setting up a privacy zone in a preferred embodiment of the present invention. It should be noted that all steps shown in FIG. 3 need not occur contemporaneously nor in the sequence shown in FIG. 3. For instance, as part of a system initialization process, a user may delineate the boundaries of the privacy zone without, at that time, selecting the features to be disabled. Further, a user may change the features previously disabled or temporarily stop any disabling of the mobile device.

At step 302, a user preferably accesses a network to access the geographic area under control of the user. Preferably, the user will have been given permission to control the features available in either a portion or all of a network. In one non-limiting example, in the instance of a cellular telecommunications network, a user may be given permission to control available features in a specified geographic region. In another non-limiting example, a user may be the administrator for a local wireless communication network such as a residential home network. In either case, in some manner, the user has been granted the rights to control the wireless communication features available in a geographic area.

Continuing with method 300 shown in FIG. 3, once the user accesses the network, to assist the user, at step 304, the network preferable will display for the user the wireless coverage area controlled by the user. In another embodiment, step 304 may not be necessary if the user is already aware of the coverage area boundaries and does not need the additional display. The display may take many forms, including text and/or graphical such as a map overlay.

After the user is presented with the coverage area under the user's control, at step 306, the user preferably selects the boundaries for the privacy area, i.e. the geographic area in which at least one cell phone feature has been disabled by the user. After the privacy area boundaries are selected, the user preferably selects which cell phone features will be disabled at step 308. After the user completes the user's selections, the system is reconfigured at step 310 to establish a privacy zone, including the boundaries and available features a cell phone will have access to while the cell phone is located in the privacy zone.

Figure 4:
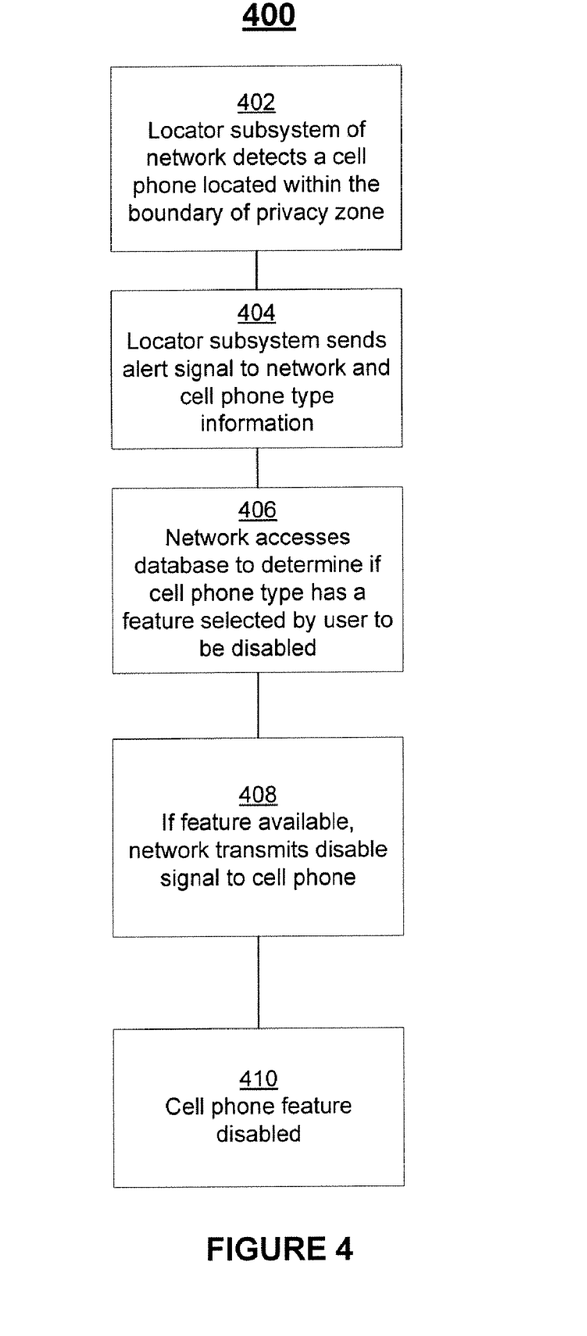
FIG. 4 is a flow diagram of a method for disabling a feature on a wireless mobile device located within a privacy zone in a wireless network in accordance with the system of FIG. 1.

Once method 300 has been performed and the system has been configured, method 400 describes how the detection and disabling of cell phone features occurs. Referring to FIG. 4, at step 400, a locator subsystem of the network detects a cell phone in the privacy zone. The locator subsystem may be either part of the network itself or a standalone device in communication with the network. In a non-limiting example, a locator subsystem that is part of the network may be a processor that receives cell phone transmit signal time delay measurements from a plurality of base stations, and based upon the information, determines the location of the cell phone. In another non-limiting example, a locator subsystem that is a standalone device may be a near-field communication device detector located in a gate at a ball park. Upon a near-field communication enabled device passing through the gate, the detector will detect the device and send a signal to the network that the device is located in the ballpark.

As described in the prior example, once a cell phone has been detected to be within the privacy zone, at step 404 the locator subsystem preferably sends an alert signal to the network indicating that a cell phone has been located in the privacy zone. At step 404, the locator subsystem preferably also sends any information regarding the make and model of the cell phone via IMEI (International Mobile Equipment Identity) to the network. Once the network receives the alert signal, at step 406 the network preferably accesses a database to determine if the cell phone has available for use the features the user selected to be disabled. At step 408, if it is determined that the cell phone has the selected feature available, the network preferably transmits a disable signal to the cell phone and the cell phone feature will be disabled at step 410. In a preferred method, the transmit signal and subsequent disabling of the feature may be performed by over the air provisioning, but one of relevant skill in the art should appreciate that the present invention can be used with any remote method of disabling, either presently known or developed in the future.

Figure 5:
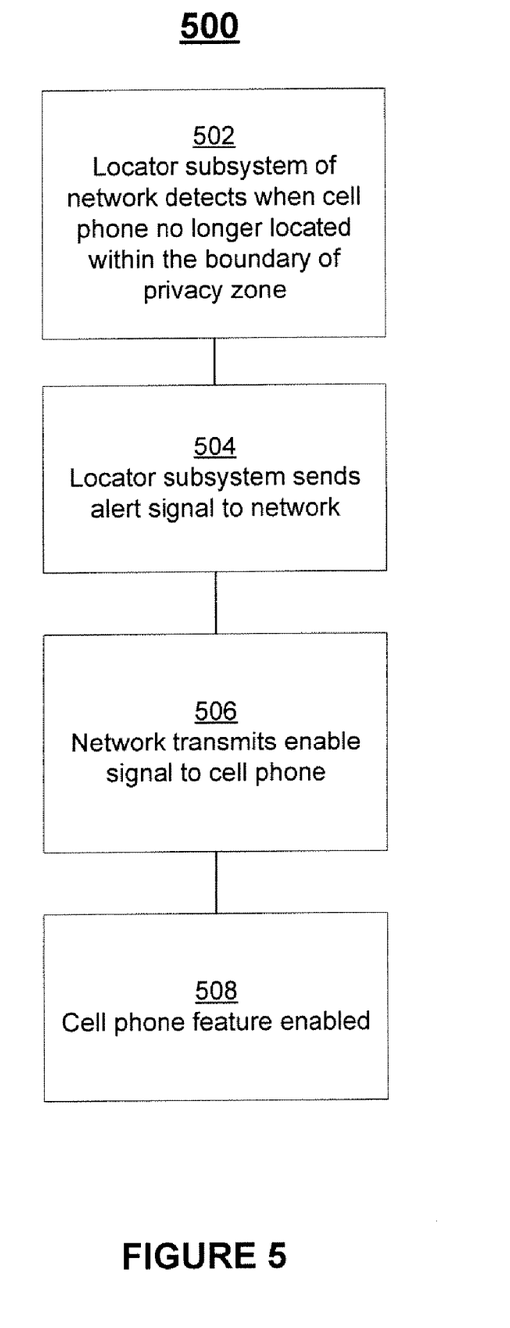
FIG. 5 is a flow diagram of a method for enabling a feature on a wireless mobile device located within a privacy zone in a wireless network in accordance with the system of FIG. 1.

It is preferable that the cell phone feature only be disabled while the mobile device is located in the privacy zone. In that manner, method 500, as shown in FIG. 5, is a preferred method of restoring the functionality of the cell phone. When the cell phone leaves the boundaries of the privacy zone, in step 502, the locator subsystem preferably sends a signal to the network, at step 504, alerting the network that the cell phone has left the privacy zone. The network subsequently, at step 506, preferably transmits an enable signal to re-enable, at step 508, the cell phone feature previously disabled.

Figure 6:
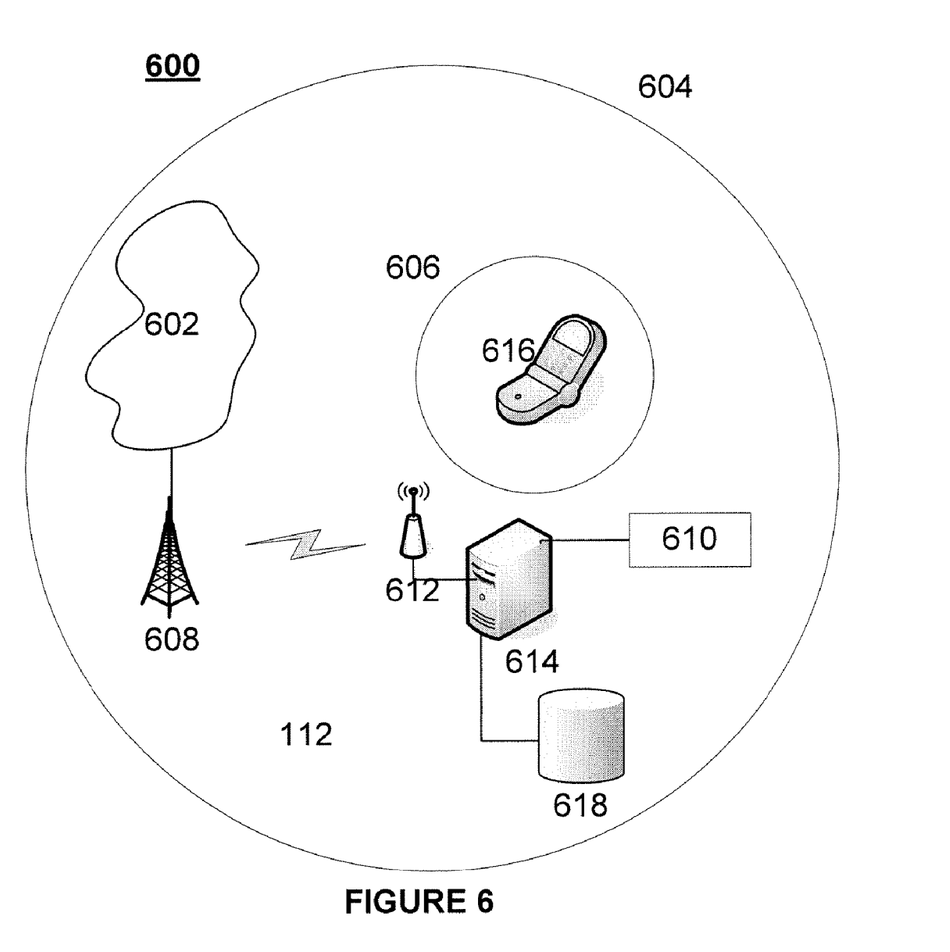
FIG. 6 is a block diagram of an alternate embodiment of the privacy system showing local control.

FIG. 6 illustrates an alternative embodiment of the present invention where the present invention is partially handled by a remote system and a partially handled by a local subsystem to preferably free up communication bandwidth and to increase the granularity of the system. In one non-limiting example, a user desires to establish multiple privacy zones throughout a high-rise tower. The privacy zones are the offices of the executives of a company and specific conference rooms where highly sensitive corporate information is displayed. If system 600 of FIG. 6 were served by only base station 608, it may be difficult to accurately locate a cell phone in the building and, subsequently, even more difficult to locate a cell phone in a specific room. Further, if the voice and/or data traffic handled by the base station is especially high, enable and disable signals sent by network 602 through base station 608 may significantly reduce the available capacity of network 602.

Instead of taxing network 602, in an alternative embodiment of the invention, the process is de-centralized and a significant portion of the functionality of the present invention is handled at the local level, as shown more fully in FIG. 6. Referring back to FIG. 6, system 600 preferably has wireless base station 608 that provides wireless communication coverage to cell 604. Privacy zone 606 is preferably formed according to the teachings of the present invention. Wireless base station 608 is preferably controlled by communications network 602. To implement an alternative embodiment of the present invention, system 600 further includes local control unit 614 and local base station 612 and local locator subsystem 610. Although FIG. 6 shows only one locator subsystem in use, multiple locator subsystems may be employed to assist network 602 in detecting the location of cell phones in various areas.

Local control unit 600 may be a local computer or handheld wireless device, and is preferably in communication with network 602. It is shown in FIG. 6 that local control unit 600 is preferably in communication with network 602 through base station 608. It should be appreciated by those of ordinary skill in the art that local control unit 614 may be in communication with network 602 through various communication paths including a wireless communication path, the internet or a local network. Local base station 612 preferably transmits enable and disable signals preferably generated by either local controller 614 or network 602. Local base station 612 may be used in situations where a high degree of granularity is necessary for implementation of the present invention or where the transmit and receive signal strength of base station 608 is degraded. For instance, in a multilevel building serviced by base station 608, transmit and receive signal strength may be less than viable.

To more fully illustrate the de-centralization of the invention, a user preferably accesses network 602 through local control unit 614. The user preferably delineates the boundaries of privacy zone 606 and the mobile device features to be disabled if a mobile device is located in that privacy zone. Once mobile device 616 is detected in privacy zone 606 by local locator subsystem 610, local locator subsystem 610 preferably sends an alert signal to local control unit 614, the alert signal preferably including the make and model of the mobile device. Upon receipt of the alert message, local control unit 614 preferably accesses local database 618 to determine if the mobile device detected in privacy zone 606 has at least one of the features selected by the user to be disabled in privacy zone 606.

Local database 618 preferably has a listing of all mobile devices on the market and their available features. Local database 618 is preferably populated and updated by various methods, including population and updating by local control unit 614 or network 602. Further, although it is shown that local database 618 is in communication with local control unit 614, it should be appreciated by one of relevant skill in the art that local database can be in communication with various sources through various means.

Continuing with FIG. 6, if after accessing local database 618 local control unit determines that mobile device 616 has a feature to be disabled, according to an alternate embodiment of the present invention, local control unit 614 preferably causes local base station 612 to transmit a disable signal to disable the selected features. Once mobile device is detected to be outside of privacy zone 606, local control unit 614 preferably causes local base station 612 to transmit an enable signal to enable those mobile device features previously disabled.

As shown, in the alternate embodiment of the present invention of FIG. 6, preferably no significant communication bandwidth of network 602 is used to transmit disable or re-enable signals. Further, preferably no significant communication bandwidth of network 602 is used to receive a detecting signal from locator subsystem 610. As shown by FIG. 6, the detection of a mobile device and the enabling/disabling of specified features can be controlled at the local or remote level.

One skilled in the relevant art should appreciate that portions of the invention may be embodied in the form of program code (i.e. instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. Portions of the invention may also be embodied in the form of program code that is transmitted over some transmission medium, such as over electrical wiring or cabling, through fiber optics, over a network, including the Internet or an intranet, or via an other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing illustrations have been provided merely for the purpose of explanation and are in no way to be construed as limiting of the invention. While the invention has been described with reference to illustrative embodiments, it is understood that the words which have been used herein are words of description and illustration, rather than words of limitation. Further, although the invention has been described herein with reference to particular structure, methods, and embodiments, the invention is not intended to be limited to the particulars disclosed herein; rather, the invention extends to all structures, methods, and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed:

1. A method for creating a privacy zone in an area with wireless communication coverage, the method comprising:
   creating a database comprising a listing of mobile devices and enabled features associated with each of the mobile devices;
   receiving a non-geometric description of a privacy zone;
   defining a boundary of the privacy zone based on the non-geometric description, wherein a physical location of the boundary based on the non-geometric description can vary;
   selecting from a plurality of mobile device features at least one feature to be disabled if one or more of the mobile devices is located within the boundary of the defined privacy zone;
   detecting the one or more of the mobile devices located in the defined privacy zone;
   determining if the one or more of the mobile devices has the at least one enabled feature to be disabled by accessing the database; and
   transmitting a signal to disable the at least one enabled feature of the plurality of mobile device features while the one or more of the mobile devices is located within the boundary of the defined privacy zone if it is determined that the one or more of the mobile devices has the at least one enabled feature to be disabled.

2. The method of claim 1, further comprising the steps of:
   detecting when the at least one or more of mobile devices is no longer located within the boundary of the defined privacy zone; and
   enabling the at least one enabled feature that was disabled.

3. The method of claim 1, wherein the defined privacy zone is defined based upon a longitude and latitude coordinate system.

4. The method of claim 3, wherein the longitude and latitude are referenced to time difference of arrival.

5. The method of claim 3, wherein the longitude and latitude are referenced to a global position system.

6. The method of claim 1, wherein the defined privacy zone is defined based upon a mobile device signal transmission strength.

7. The method of claim 1, wherein the defined privacy zone is defined based upon proximate distance of a mobile device to a near field communication port.

8. The method of claim 1, wherein the plurality of mobile device features comprises at least one of voice calling, incoming call alert, incoming message alert, text messaging, instant messaging, picture messaging, video messaging, camera, or video.

9. The method of claim 1 wherein detecting a mobile device located in the defined privacy zone comprises determining the location of the mobile device relative to the defined privacy zone.

10. The method of claim 9, wherein determining the location of the mobile device relative to the defined privacy zone comprises a calculation of the mobile device coordinates.

11. The method of claim 9, wherein determining the location of the mobile device relative to the defined privacy zone comprises a measurement of the wireless signal transmission strength of the mobile device.

12. The method of claim 9, wherein determining the location of the mobile device relative to the defined privacy zone comprises a signal from a global positioning system.

13. The method of claim 9, wherein determining the location of the mobile device relative to the defined privacy zone comprises the detection of the presence of a near field communication enabled mobile phone within a detectable distance to a near field communication post.

14. The method of claim 1, further comprising disabling the at least one of the selected plurality of enabled features through over the air provisioning.

15. A wireless communication system for creating a privacy zone, the system comprising:
   at least one server computer coupled to a wireless base station;
   a mobile device detection subsystem coupled with the at least one server computer;
   a user input system coupled with the at least one server computer;
   a database coupled with the at least one server computer, wherein the database comprises
   a list of mobile devices and respectively associated enabled features and is updatable with mobile device feature information,
      wherein the at least one server computer is configured to:
         receive a command from the input system generated by a user to define a privacy zone within the wireless network, wherein the privacy zone is defined based on a non-geometric description of the privacy zone, wherein a physical location of a boundary based on the non-geometric description of the privacy zone can vary;

receive a command from the input system generated by a user to delineate at least one mobile device enabled feature to be disabled in the defined privacy zone;

receive an input signal from a location subsystem if a mobile device is determined to be in the defined privacy zone;

determine if the mobile device has the at least one enabled mobile device feature; and output a command to disable the at least one enabled mobile device feature.

16. The system of claim 15, wherein the at least one server computer is further configured to:

receive an input from the location subsystem when the mobile device leaves the defined privacy zone; and output a command to enable the at least one disabled feature.

17. A method for configuring a wireless device based upon the location of the wireless communications device in a geographic area having wireless communication coverage, the method comprising:

identifying a database comprising a listing of mobile devices and enabled features associated with each of the mobile devices;

receiving a non-geometric description of a privacy zone;

defining a boundary of the privacy zone, based on the non-geometric description, within the geographic area, wherein a physical location of the boundary based on the non-geometric description can vary;

selecting at least one of a plurality of enabled mobile device features to be disabled if a mobile device is located within the boundary of the defined privacy zone;

detecting a mobile device;

determining if the mobile device has the at least one enabled feature to be disabled by accessing the database; and transmitting a signal to disable the at least one of the selected plurality of enabled mobile device features if the mobile device has the at least one of the selected plurality of enabled mobile device features.

18. The method of claim 17, further comprising:

detecting when the mobile device is no longer located within the boundary of the defined privacy zone; and enabling the selected plurality of enabled mobile device features that were disabled.

19. A non-transitory computer-readable storage medium having executable instructions stored thereon, for configuring a mobile device having a plurality of features, the configuration based upon the location of the mobile device in a geographic area having wireless communication coverage, the instructions, when executed on a processor, causing the processor to perform the following: receiving a non-geometric description of a privacy zone; receiving a boundary of a privacy zone based on the non-geometric description, wherein a physical location of the boundary based on the non-geometric description can vary; receiving at least one of a plurality of mobile device enabled features to be disabled while a mobile device is located in the defined privacy zone; receiving the detection of a mobile device in the defined privacy zone; receiving information about the mobile device to determine if the mobile device has the at least one feature enabled by accessing a database comprising a list of mobile devices and respectively associated enabled features and determining using the information if the mobile device detected in the privacy zone has at least one of the selected plurality of enabled features to be disabled; and if the mobile device has at least one of the selected plurality of enabled features, transmitting a signal to disable the selected plurality of features of the mobile device while the mobile device is located within the boundary of the defined privacy zone.

20. A method for creating a privacy zone in a geographic area having wireless communication coverage, said method comprising:

defining a privacy zone based on a non-geometric description of the privacy zone, wherein:
 a physical location of a boundary based on the non-geometric description of the privacy zone can vary; and
 a camera feature of a mobile device will be disabled;

populating a database with a list of a plurality of mobile devices having a camera feature available for consumer purchase;

detecting the mobile device in the privacy zone;

accessing the database to determine if the mobile device detected is in the list of mobile devices having an enabled camera feature;

if the mobile device is in the list, sending a camera disable configuration message to the mobile device to disable the camera feature of the mobile device.

21. A wireless telecommunications network configured to create a privacy zone in a geographic area having wireless communication coverage, the network configuration comprising:

means for creating a database comprising a listing of mobile devices and enabled features associated with each of the mobile devices;

means for defining a boundary of a privacy zone located within the geographic area wherein;
 the boundary of the privacy zone is based on a non-geometric description of the privacy zone; and
 a physical location of the boundary based on the non-geometric description can vary;

means for selecting at least one mobile device feature from a plurality of mobile device features to be disabled if a mobile device is located within the boundary of the defined privacy zone;

means for detecting a mobile device located in the defined privacy zone;

means for determining if the mobile device has the at least one feature to be disabled by accessing the database; and means for disabling the at least one of the selected plurality of enabled features of the mobile device while the mobile device is located within the boundary of the defined privacy zone if the selected plurality of enabled features are enabled on the mobile device.

22. The network configuration of claim 21, further comprising:

means for detecting when the mobile device is no longer located within the boundary of the defined privacy zone; and means for enabling the at least one of the selected plurality of enabled features that were disabled.

23. A non-transitory computer-readable storage medium having executable instructions stored thereon, wherein the instructions are used by a microprocessor for creating a privacy zone in a geographic area having wireless communication coverage, the instructions comprising:

an instruction set for defining a boundary of a privacy zone located within the geographic area, wherein:
 the boundary of the privacy zone is based on a non-geometric description of the privacy zone; and
 a physical location of the boundary based on the non-geometric description can vary;

an instruction set for selecting at least one mobile device feature from a plurality of mobile device features to be disabled if a mobile device having the at least one mobile device feature enabled is located within the boundary of the defined privacy zone;

an instruction set for detecting a mobile device located in the defined privacy zone;

an instruction set for determining if the mobile device has the at least one feature enabled which is to be disabled by accessing a database comprising a list of mobile devices and respectively associated enabled features; and an instruction set for disabling the selected plurality of enabled features of the mobile device while the mobile device is located within the boundary of the defined privacy zone if the selected plurality of features are available on the mobile device.

24. A privacy zone in a geographic area, wherein selected mobile device features are remotely disabled while a mobile device is located in the privacy zone, wherein the geographic area has wireless communication coverage, the privacy zone generated by the steps of:

defining a boundary of a privacy zone within the geographic area, wherein:
the boundary of the privacy zone is based on a non-geometric description of the privacy zone; and
a physical location of the boundary based on the non-geometric description can vary;

selecting at least one mobile device feature from a plurality of mobile device features to be disabled if a mobile device is located within the boundary of the defined privacy zone;

detecting a mobile device located in the defined privacy zone;

determining if the mobile device has the at least one enabled feature to be disabled by accessing a database comprising a list of mobile devices and respectively associated enabled features; and if at least one of the selected plurality of features are enabled on the cell phone, disabling the selected plurality of features of the mobile device while the mobile device is located within the boundary of the defined privacy zone.

25. An apparatus for creating a privacy zone in a geographic area having wireless communication coverage area provided by a wireless communication network to a plurality of wireless communication devices, wherein:

said communication coverage area provides a plurality of wireless communication coverage features to said wireless communication devices;

said communication coverage is controlled by a user;

the apparatus is in communication with the wireless communication network;

said wireless communications network is in communication with a wireless communication device locator subsystem, the apparatus comprising:

means for providing a display to a user, wherein said display informs the user of the boundaries of the coverage area under control of the user;

means for inputting the boundaries of a privacy zone located within the coverage area, wherein:
the boundaries of the privacy zone are based on a non-geometric description of the privacy zone; and
physical locations of the boundaries based on the non-geometric description can vary;

means for determining if the mobile device has enabled the at least one feature to be disabled by accessing a database comprising a list of mobile devices and respectively associated enabled features; and means for selecting a plurality of wireless communication coverage features to be disabled while a wireless communications device is located within the privacy area.

26. The apparatus of claim 25, further comprising:
means for receiving an input from the locator subsystem that a wireless mobile device has been detected within the privacy zone.

27. The apparatus of claim 25, further comprising:
means for sending a disable signal to the wireless communications device to disable said selected plurality of enabled features.

\* \* \* \* \*